United States Patent Office

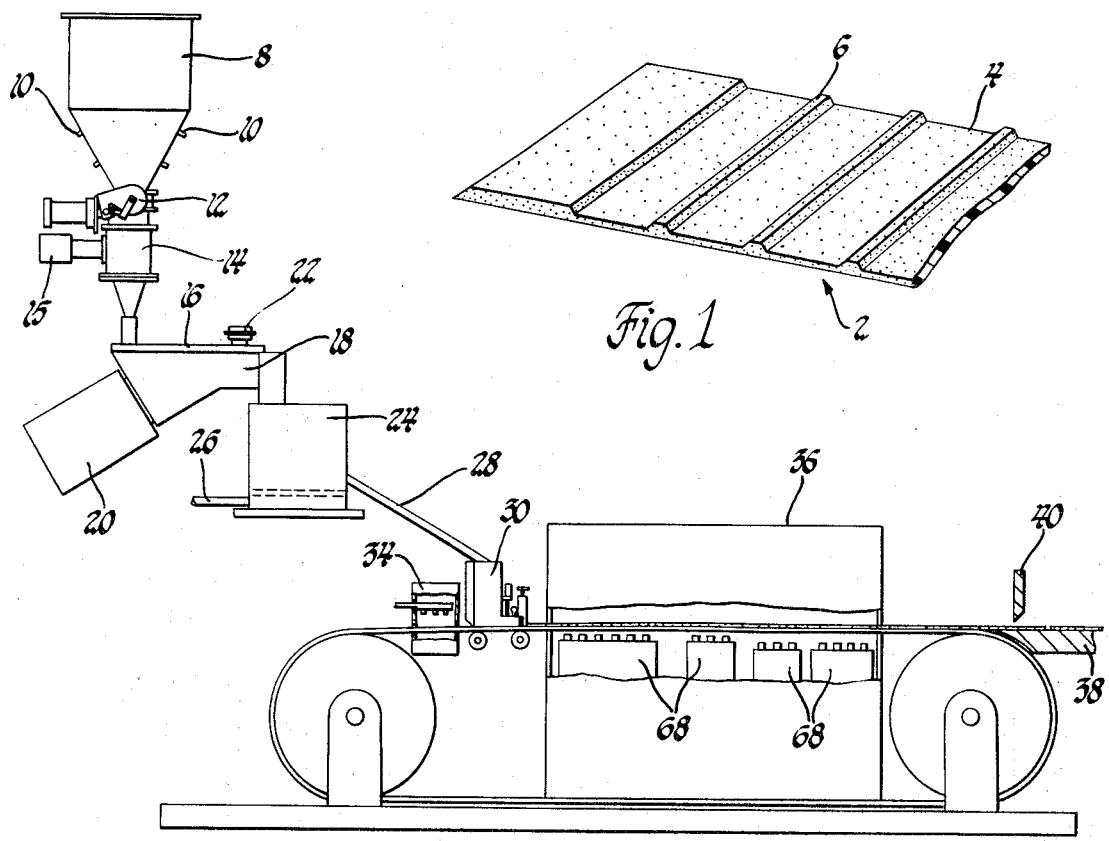
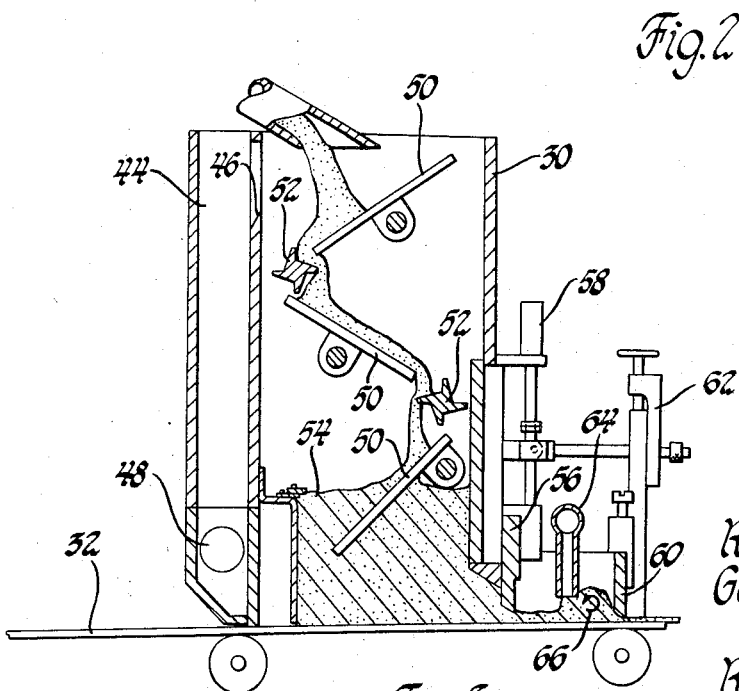

3,551,210
Patented Dec. 29, 1970

3,551,210
PROCESS FOR THE HIGH-SPEED MANUFACTURE
OF PVC BATTERY SEPARATORS
Max E. Bahler and Roger W. Kellams, Anderson, George
L. Larkin, Jr., Muncie, Roy F. Selby and Robert G.
Senseney, Anderson, and Webster T. Van Fleet, Yorktown, Ind., assignors to General Motors Corporation,
Detroit, Mich., a corporation of Michigan
Filed Feb. 3, 1969, Ser. No. 796,109
Int. Cl. H01m 3/00
U.S. Cl. 136—148
2 Claims

ABSTRACT OF THE DISCLOSURE

Process for the high speed manufacture of continuous strips of ribbed, sintered polyvinyl chloride (PVC) battery separators. Processing includes PVC particle moisture control, fluidization of particle stream, deaeration of particle stream by successive baffling, maintenance of kinetic mound of particles behind a contouring comb, contouring of the particles, preheating particles to sub-sintering temperatures and rapid sintering of the particles.

---

Processes for sintering of PVC particles to manufacture continuous strips of battery separators are known. Heretofore these processes have been limited to production speeds of less than 100 feet per minute of strip. Production speeds have been heretofore so limited owing, in part, to the problems involved with handling and moving pulverulent polyvinyl chloride at higher rates. One of these problems is agglomeration of the PVC powder which, as by clotting, disrupts the continuity of powder flow and causes intermittent surging or dumping of amassed particles at various stages in the system. These surges or "dumps" upset the steady state conditions so necessary to continuously comb and sinter PVC particles at higher rates.

It is an object of our invention to produce continuous strips of ribbed, sintered PVC battery separators at rates substantially in excess of 150 feet per minute and preferably at rates of at least about 200 ft./min. This and other objects of our invention will become more apparent from the detailed description which follows.

Our invention comprehends the high speed manufacture of ribbed polyvinyl chloride (PVC) battery separators, which separators are formed by sintering PVC particles into continuous strips. By our process, high speed production rates substantially in excess of 150 ft./min. are commercially practicable. These production rates are attained by providing a substantially nonsurging, nondumping, powder-supply system which, once steady state is reached, will uninterruptingly feed PVC powder to a contouring comb under such conditions as to produce immediately behind the comb a kinetic mound of particles having a head between about 0.75 inch to about 1.25 inch, a moisture content of about 0.1% to about 0.3% by weight water and a bulk density of about 27 lbs./ft.$^3$ to about 36 lbs./ft.$^3$. This is accomplished by preventing agglomeration of the PVC particles which causes "hang-up" of the particles in the system. Particle agglomeration is one of the principal causes of surging or dumping. We have found that agglomeration occurs principally under conditions where the moisture content is either less than about 0.1% by weight H$_2$O or more than about 0.3% water. When the moisture content is too low, static electricity causes the agglomeration as well as sticking to equipment walls. When the moisture is too high agglomeration apparently results from a surface tension phenomenon. The first step in reducing agglomeration in the system is to control the moisture content of the raw materials. By our process the raw materials are initially conditioned by a fluffing action in which controlled humidity and temperature air is passed through and agitates the mass of powders to dry or humidify them, as required, to the 0.1%–0.3% by weight H$_2$O level. The particles are next screened to remove macro-sized contaminants and break up any agglomerates not removed during conditioning. A second significant step in eliminating particle agglomeration and "hang-up" is fluidization of the mass of particles to a bulk density of about two-thirds its original bulk density which insures a continuous flow of particles even at the rates required to support the 150 ft./min. strip production rates. The bulk density of the mass of PVC particles immediately before contouring is most advantageously between 27 lbs./ft.$^3$ and 36 lbs./ft.$^3$. This bulk density is about 35%–80% greater than that of the stream of fluidized particles. Accordingly, the bulk density is increased just before the contouring comb by passing the stream over a series of baffles. The baffling deaerates or densifies the stream by causing the powder to settle out. The densified particle mass is deposited on a moving belt in a quantity which is in excess of that which ultimately passes beneath the contouring comb. This excess builds up behind the contouring comb to form a mound of constantly rolling and moving particles. The mound, in effect, becomes an eddy of moving particles which must be steadily kept in this kinetic or dynamic state if acceptable separators are to be produced. Maintenance of this kinetic condition at production rates substantially above 150 ft./min. is a comparatively delicate matter and requires virtually steady state conditions throughout the PVC supply system. The powders are contoured by combing, rapidly heating to a presintering temperature and finally sintered into a continuous strip.

FIG. 1 is a partially sectioned perspective view of a battery separator made from the process of this invention.

FIG. 2 is a side elevational schematic representation of the process of this invention.

FIG. 3 is a partially sectioned side elevational view of a densifying feeder hopper usable with the baffling and deaeration steps of this process.

FIG. 1 depicts a ribbed battery separator 2 made in accordance with the teachings of this invention. The separator 2 comprises a web portion 4 and rib portions 6. The thickness of the web portion 4 is less than about 0.025 inch and preferably about 0.019 inch. The thickness at the rib portion 6 is less than about 0.050 inch and preferably about 0.040 inch. The 0.025 inch separators have initial electrical resistances of 0.024 ohm/in.$^2$ at 80° F. and 0.057 ohm/in.$^2$ at 0° F. After dry charge, these same separators demonstrated electrical resistances of 0.027 ohm/in.$^2$ at 80° F. and 0.060 ohm/in.$^2$ at 0° F.

FIG. 2 schematically shows apparatus for carrying out the subject process. The PVC raw materials as received from the manufacturer are placed in a processing or conditioning hopper 8. These raw materials, when received, are hollow spheroidal powders ranging from 3 to 60 microns in diameter. The powders are comprised of polyvinyl chlorides in the molecular weight range of about 90,000 to 95,000 and generally contain about 0.03% to about 0.60% by weight water. The precise moisture content varies from batch to batch of raw materials and is affected by both the ambient atmosphere both during shipment and storage. For a 200 ft./min. production line, the conditioning hopper 8 advantageously has an 1800 lb. capacity for PVC. The PVC in the hopper 8 is conditioned by an air-fluffing action which comprises introducing about 450 ft.$^3$/hr. of air into the hopper 8 through the inlets 10. This air is first refrigerated to a dew point of about 46° F. then reheated to about 200° F. before introduction into the hopper 8. The conditioning continues until the moisture level of the powder is brought within the range of 0.1%–0.3% by weight water and any major agglomerates formed in shipment or storage are broken up. The conditioning is normally a drying operation. However, should the powder be dry (e.g., less than 0.10% water) the conditioning air can be readily rehumidified by introducing water or water vapor into the air after it is heated to the 200° F. temperature. Occasionally, particular batches of the powders have a stronger tendency to agglomerate than do other batches. When this occurs, small quantities (e.g., about 10 cubic feet per hour) of ammonia gas can be bled into the conditioning air to reduce the agglomeration. A similar ammonia bleed corresponding to about 5 cubic feet per hour can be added to the fluidizing air.

After conditioning, the powder is introduced into the powder supply system. An on-off slide valve means 12 is provided to open or close the hopper 8. A rotary valve 14 and actuator means 15 therefor dispenses particles at a varying rate in accordance with the demands of the supply system. The valves 12 and 14 are controlled by a level indicator 22 which senses the powder level in the trough 18. The powders are screened through a sieve 16 which breaks up any remaining agglomerates and removes contaminants from the powder. The size of the sieve 16 can vary from about a 40 mesh to 80 mesh (U.S. standard) with a 60 mesh stainless steel screen being preferred. After screening the powder is caught by the trough 18. The screen 16 and trough 18 are vibrated by motor means 20. The vibrator motor 20 is controlled (on-off) by a powder level indicator (not shown) in the fluidizing tank 24. The ability to shut off the powder flow between the trough 28 and the tank 24 is important in order to maintain substantially steady conditions throughout the system. The head of powders in the fluidizer 24 should be controlled so as not to substantially vary more than about 1 inch from a predetermined level if these steady state conditions are to be closely maintained.

Powder from the trough 18 flows to a fluidizer 24 and therein is subjected to controlled temperature and humidity air to reduce the bulk density of the mass of particles by about one-third its original bulk density to about 20 lbs./ft.$^3$. The fluidizer 24 has a capacity of about 22 ft.$^3$ and with a flow of air of about 225 ft.$^3$/hr. effects the desired one-third bulk density reduction. The fluidizing air, like the conditioning air, is refrigerated to a dew point of about 46° F. and subsequently heated to about 200° F. This air is admitted to the fluidizer 24 through conduit 26. By holding the head of the powder in the fluidizer 24 constant and maintaining a constant air flow rate the proper ratio of powder to air is conveniently obtained and retained under steady state conditions. Fluidizing the particles provides several distinct advantages. Fluidization, in effect, thins out the mass of particles which further reduces their tendency to agglomerate downstream of the fluidizer. The increased inter-particle spacing in the fluidized stream apparently reduces the frequency of contact, as well as the attractive forces, between the particles. Likewise, since the stream of particles is less dense, less sensitive metering and control means can be utilized in controlling the head 54 of particles on the belt 32 in the feeder hopper 30 which, in turn, simplifies the controls required in the region of the comb 60.

As best shown in FIG. 3, the fluidized particles are next fed to a feed chamber 42 in a feed hopper 30 by means of several tubes 28. In feed hopper 30 the particle stream passes over a series of baffles 50. Between the baffles 50, rotary valves 52 agitate the powder and keep it moving in the proper direction over the several baffles. This baffling of the particle stream causes the particles to settle out and accordingly the bulk density of the stream is sequentially increased from its 20 lbs./ft.$^3$ bulk density in the tube 28 to the higher 27 lbs./ft.$^3$–36 lbs./ft.$^3$ bulk density required at the bottom of the feed hopper 30. Because the bulk density of the powders entering the feed hopper 30 is substantially less than the bulk density at the hoper exit, the head 54 of the higher bulk density powders in the hopper is readily controllable to obtain a substantially constant head of powder on the belt at the hopper exit. As will be discussed herienafter, a substantially constant pressure head of powder on the belt at this point is desirable if the requisite kinetic condition of the powder behind the comb is to be retained. The head 54 is maintained at approximately 12–15 inches above the belt 32. This head is maintained at this level by controlling the input of the less dense powders from the fluidizer 24 to the hopper 30 and, by means of an adjustable dam 56, the exit of the more dense powders from the bottom of the hopper 30. Next to the feed hopper 30 is an overflow chamber 44. Should the head 54 in the feeder hopper 30 get too high, the excess powders flow over the weir 46 into the chamber 44 and are recovered therefrom by vacuum recovery means 48. The recovered particles are recycled back into the conditioning hopper 8.

An endless belt 32 is comprised of smooth stainless steel having a uniform thickness of about 0.032 inch ±0.001 inch. The uniformity of the belt is necessary in order to insure substantially uniform heat transfer through the belt in the oven. This belt moves at about 200 ft./ min. under the feeding hopper 30 and carries with it a layer of powder having a thickness equal to the height of the dam 56 above the belt 32. The dam 56 is positioned between about 0.035 inch to 0.040 inch above the belt 32 which is somewhat higher than the height of the comb 60 above the belt 32. The comb is maintained at about 0.032 inch above the belt to produce a 0.025 inch thick separator. For 200 ft./min. production the dam and comb are about 4 inches apart. The height of the dam 56 can be varied by a dam adjusting means 58. Similarly, the height of the comb 60 above the belt 32 can be varied by a comb adjusting means 62. More powder is fed to the comb 60 than passes under it. The excess powders back up behind the comb and form a mound 66. The nature of the mound 66 determines the quality of the finished separator. Substantially all of the materials handling controls up to this point have been provided in order to facilitate the control of the nature and quality of this mound 66. We have found that to produce PVC strips at rates in excess of 150 ft./min., the mound 66 must be kept in constant rolling or eddy-like motion immediately behind the comb 60. When this motion stops and the mound 66 becomes stagnant, unsatisfactory separators are formed. The head of the mound is maintained between about 0.75 inch to 1.25 inch. When the head of this rolling, kinetic or dynamic mound raises more than about 1.25 inch above the belt behind the comb, the rolling motion stops and the powder behind the comb apparently tends to pack. This packing causes shear between the powder layer and the belt as well as between the several tiers of powder which make up the powder layer at the comb. This shearing action causes an irregular surface on the separator, increases its permeability to an unacceptable level and causes loss of dimensional control especially with respect to the ribs. When the head of the mound is less than about 0.75 inch the rolling action is erratic causing streaking of the separators with thinned out, nonuniform sections such as would be expected when there is insufficient powder behind the comb. The bulk density of the powders at the comb also affect the quality of the finished separator. If the bulk density is less than about 27 lbs./ft.$^3$ too much air is present and bubbles are formed in the separators. If the bulk density is above about 36 lbs./ft.$^3$, the solids content of the separator increases and there is more of a tendency for the aforesaid shearing action to occur. A vacuum skimming device 64 is used to maintain the dynamic or kinetic quality of the mound 66 since use of the dam 56 alone does not provide a sensitive enough control at these high production rates. The vacuum skimmer 64 is so located as to prevent the excess powders upstream of the comb from raising the head of the mound 66 above about 1.25 inch at which level the mound becomes stagnant. The vacuum skimmer 64 is one of the most useful tools available for maintaining the head and kinetic quality of the mound 66 under steady state conditions. The vacuum skimmer 64 operates on a vacuum of approximately 10 inches of water and will remove and reclaim between about 25% to about 40% of the powders in the region between the dam 56 and the comb 60.

Referring again to FIG. 2, the layer of powder flowing from under the comb 60 is heated and sintered. The powders are first heated for less than about 0.5 minute to raise their temperature to at least about 375° F. prior to actual sintering. The particles are finally heated for less than about 0.4 minute to raise their temperature to at least about 415° F. In the particular embodiment shown in FIG. 2, the initial rapid heatup of the particles to the 375° F. presintering temperature is accomplished in the first two stages of a four-stage oven 36 having gas burners 68 heating the separators through the belt 32. The first two burners are located approximately 2 inches below the stainless steel belt 32. The first stage is approximately 48 ft. long and the oven temperature is maintained at about 600° F. The second stage is about 28 ft. long and is maintained at an oven temperature of about 400° F. The third and fourth stages finish heating and sintering and are 28 ft. and 32 ft. long, respectively, and maintained at oven temperatures of about 610° F. and 475° F., respectively. It is to be appreciated that these oven temperatures will vary depending on the location of the temperature sensor in each oven and accordingly are not intended to restrict our invention other than to the extent of preheating and sintering discussed above.

After sintering, the strip is cooled by any convenient cooling means such as forced air or water (not shown). The strip is peeled from the belt 32 by a stripper means 38 and subsequently cut into the desired lengths as by a knife means 40. Typical separators have a length of about 5 inches and a width of about $5^{15}/_{16}$ inches. The belt 32 is cleaned and washed by an appropriate means (not shown) and returned to the feeder hopper 30. A gas-fired oven 34 heats the stainless steel belt to about 100–150° F. to completely dry same before powder is deposited thereon.

While our invention has been disclosed solely in conjunction with a particular embodiment thereof, we do not intend to be limited other than to the extent hereinafter defined.

We claim:

1. A process for the high speed manufacture of continuous strips of ribbed polyvinyl chloride separators for storage batteries which separators comprise a web portion and a ribbed portion, said process comprising the steps of providing a mass of discrete hollow, spheroidal, polyvinyl chloride particles in the size range of about 3 to about 60 microns, conditioning said mass to establish and maintain a moisture content of not less than about 0.1% by weight nor more than about 0.3% by weight water, fine screening said mass to remove contaminants and particle agglomerates therefrom, aerating said mass to reduce its bulk density and to fluidize said mass for continuous delivery under substantially uniform pressure to a means for densifying said mass, passing said mass over successive baffling stages to deaerate and densify said mass to a bulk density of at least about 27 lb./ft.³ but less than about 36 lb./ft.³, depositing a first predetermined thickness of said mass loosely in a layer on a moving belt, said first thickness being greater than the thickness of said finished separator, passing said moving sheet and layer under a contouring comb to contour a surface of said layer and reduce said first predetermined thickness to a second predetermined thickness which is also greater than the thickness of said finished separator, establishing and maintaining a dynamic mound of said mass behind said comb during contouring, said mound being substantially greater in height than said first thickness and in the range of at least about 0.75 inch but less than about 1.25 inch above said belt, vacuuming substantial quantities of said mass from the base of said mound to maintain the height and dynamic character of said mound behind said comb, initially heating said mass for less than about 0.5 minute to a temperature of at least about 375° F. prior to sintering, and subsequently heating said mass for less than about 0.4 minute to at least about 415° F. to sinter said particles.

2. A process for the high speed manufacture of continuous strips of ribbed polyvinyl chloride separators for storage batteries which separators comprise a web portion about 0.025 inch thick or less and a ribbed portion about 0.050 inch thick or less, said process comprising the steps of providing a mass of discrete hollow, spheroidal, polyvinyl chloride particles in the size range of about 3 to about 60 microns, conditioning said mass to establish and maintain a moisture content of not less than about 0.1% by weight nor more than about 0.3% by weight water, fine screening said mass to remove contaminants and particle agglomerates therefrom, aerating said mass to reduce its bulk density to about 20 lb./ft.³ and to fluidize said mass for continuous delivery under substantially uniform pressure to a means for densifying said mass, passing said mass over successive baffling stages to deaerate and densify said mass to a bulk density of at least about 27 lb./ft.³ but less than about 36 lb./ft.³, depositing a first predetermined thickness of said mass loosely in a layer on a moving belt which has been preheated to a temperature of about 100–150° F., said first thickness being greater than the thickness of said finished separator, passing said moving sheet and layer under a contouring comb to contour a surface of said layer and reduce said first predetermined thickness to a second predetermined thickness which is also greater than the thickness of said finished separator, establishing and maintaining a dynamic mound of said mass behind said comb during contouring, said mound being substantially greater in height than said first thickness and in the range of at least about 0.75 inch but less than about 1.25 inch above said belt vacuuming substantial quantities of said mass from the base of said mound to maintain the height and dynamic character of said mound to maintain the height and dynamic character of said mound behind said comb, initially heating said mass for less than about 0.5 minute to a temperature of at least about 375° F. prior to sintering, and subsequently heating said mass for less than about 0.4 minute to at least about 415° F. to sinter said particles.

References Cited
UNITED STATES PATENTS

| | | | |
|---|---|---|---|
| 2,960,727 | 11/1960 | Bradshaw et al. | 264—126 |
| 2,973,398 | 2/1961 | Hubbard et al. | 136—145 |
| 3,123,654 | 3/1964 | Malischewski | 264—126 |
| 3,350,484 | 10/1967 | Magill, Jr. | 136—148X |
| 3,400,186 | 9/1968 | Wiley | 264—126 |
| 3,440,108 | 4/1969 | Hefftner | 136—145 |
| 3,450,571 | 6/1969 | Zenczak | 136—148 |

WINSTON A. DOUGLAS, Primary Examiner

A. SKAPARS, Assistant Examiner

U.S. Cl. X.R.

136—145; 264—126

PO-1050
(5/69)

UNITED STATES PATENT OFFICE
CERTIFICATE OF CORRECTION

Patent No. 3,551,210            Dated December 29, 1970

Inventor(s)     Max E. Bahler et al

It is certified that error appears in the above-identified patent and that said Letters Patent are hereby corrected as shown below:

Column 3, line 32, the numeral "28" should be -- 18 --.
         line 75, "hoper" should be -- hopper --.

Column 4, line 4, "herienafter" should be -- hereinafter --

Column 6, lines 47-48, delete repeated portion "to mainta: the height and dynamic character of said mound".

Signed and sealed this 29th day of June 1971.

(SEAL)
Attest:

EDWARD M. FLETCHER, JR.          WILLIAM E. SCHUYLER, JR.
Attesting Officer                 Commissioner of Patents